United States Patent
Lee et al.

(10) Patent No.: US 8,670,405 B1
(45) Date of Patent: Mar. 11, 2014

(54) MOBILE INTERNET PROTOCOL SQUARE

(75) Inventors: Jau Young Lee, Pleasanton, CA (US); Ce Xu, Concord, CA (US); William Chien-Yeh Lee, Danville, CA (US)

(73) Assignee: Cellco Partnership, Basking Ridge, NJ (US)

(*) Notice: Subject to any disclaimer, the term of this patent is extended or adjusted under 35 U.S.C. 154(b) by 2224 days.

(21) Appl. No.: 09/590,346

(22) Filed: Jun. 8, 2000

Related U.S. Application Data

(60) Provisional application No. 60/138,214, filed on Jun. 9, 1999.

(51) Int. Cl.
*H04W 4/00* (2009.01)

(52) U.S. Cl.
USPC ............ 370/331; 370/338; 370/341; 370/350

(58) Field of Classification Search
USPC ............... 370/331, 332, 333, 334, 338, 349, 370/395.52, 216, 341, 350; 709/250, 222, 709/227, 239; 455/435.3, 433, 437, 552.1
See application file for complete search history.

(56) References Cited

U.S. PATENT DOCUMENTS

| | | | |
|---|---|---|---|
| 4,829,524 A | 5/1989 | Yoshida | |
| 5,526,409 A | 6/1996 | Conrow et al. | |
| 5,684,791 A | 11/1997 | Raychaudhuri et al. | |
| 5,842,224 A | 11/1998 | Fenner | |
| 5,870,673 A * | 2/1999 | Haartsen | 455/426.1 |
| 5,956,331 A * | 9/1999 | Rautiola et al. | 370/338 |
| 5,960,361 A | 9/1999 | Chen | |
| 5,970,059 A | 10/1999 | Ahopelto et al. | |
| 6,002,999 A | 12/1999 | Han et al. | |
| 6,084,888 A | 7/2000 | Watanabe et al. | |
| 6,112,088 A * | 8/2000 | Haartsen | 455/437 |
| 6,125,283 A * | 9/2000 | Kolev et al. | 455/552.1 |
| 6,137,791 A * | 10/2000 | Frid et al. | 370/352 |
| 6,160,804 A * | 12/2000 | Ahmed et al. | 370/349 |
| 6,161,008 A | 12/2000 | Lee et al. | |
| 6,172,986 B1 * | 1/2001 | Watanuki et al. | 370/466 |
| 6,181,734 B1 | 1/2001 | Palermo | |
| 6,215,779 B1 | 4/2001 | Bender et al. | |
| 6,243,581 B1 * | 6/2001 | Jawanda | 455/432.2 |
| 6,359,880 B1 | 3/2002 | Curry et al. | |
| 6,385,180 B1 | 5/2002 | Maru | |
| 6,385,195 B2 | 5/2002 | Sicher et al. | |
| 6,397,043 B1 | 5/2002 | Kang | |
| 6,404,754 B1 | 6/2002 | Lim | |
| 6,405,052 B1 | 6/2002 | Faber | |
| 6,438,119 B1 | 8/2002 | Kim et al. | |
| 6,456,603 B1 * | 9/2002 | Ismailov et al. | 370/310 |

(Continued)

FOREIGN PATENT DOCUMENTS

WO WO-98/43456 10/1998

OTHER PUBLICATIONS

Barnes, "U.S. Appl. No. 60/127,406," filed Apr. 4, 1999.

*Primary Examiner* — Brian D Nguyen
*Assistant Examiner* — Toan Nguyen

(57) ABSTRACT

The present invention provides a method and apparatus for network access for consumers in both wired and wireless environments. Multiple-interface/multiple-connections are used to support high-speed handoff and seamless roaming between different networks (wired and wireless). The present invention is implemented by using multiple interfaces and connections to interface a mobile PC unit, providing additional functions, and enhancing current PC device drivers and software.

22 Claims, 11 Drawing Sheets

(56) References Cited

U.S. PATENT DOCUMENTS

| | | |
|---|---|---|
| 6,456,605 B1 | 9/2002 | Laakso et al. |
| 6,484,211 B2 * | 11/2002 | Turunen ..................... 709/245 |
| 6,493,325 B1 | 12/2002 | Hjalmtysson et al. |
| 6,535,493 B1 | 3/2003 | Lee et al. |
| 6,539,237 B1 | 3/2003 | Sayers et al. |
| 6,549,785 B1 | 4/2003 | Agin |
| 6,577,637 B1 | 6/2003 | Sieppi |
| 6,580,906 B2 | 6/2003 | Bilgic et al. |
| 6,587,684 B1 | 7/2003 | Hsu et al. |
| 6,611,516 B1 | 8/2003 | Pirkola et al. |
| 6,621,810 B1 * | 9/2003 | Leung ..................... 370/338 |
| 6,633,552 B1 | 10/2003 | Ling et al. |
| 6,636,498 B1 * | 10/2003 | Leung ..................... 370/338 |
| 6,643,275 B1 | 11/2003 | Gustafsson et al. |
| 6,654,359 B1 | 11/2003 | La Porta et al. |
| 6,671,266 B1 | 12/2003 | Moon et al. |
| 6,681,259 B1 * | 1/2004 | Lamilainen et al. ......... 709/250 |
| 6,711,147 B1 | 3/2004 | Barnes et al. |
| 6,718,347 B1 | 4/2004 | Wilson |
| 6,947,398 B1 * | 9/2005 | Ahmed et al. ............... 370/331 |

* cited by examiner

MOBILE INTERNET PROTOCOL SQUARE

CROSS REFERENCE TO RELATED APPLICATIONS

This application claims priority under 35 U.S.C. §119(e) of U.S. Provisional Patent Application No. 60/138,214, filed Jun. 9, 1999, entitled "MOBILE INTERNET PROTOCOL SQUARED" by David J. Y. Lee et al., which application is incorporated by reference herein.

BACKGROUND OF THE INVENTION

1. Field of the Invention

The present invention relates to cellular telephone systems, and, in particular, to wireless internet protocol (IP) use of cellular telephone systems.

2. Description of the Related Art

The Internet is quickly becoming an integral part of everyday life. As more people begin using the Internet, Internet traffic has grown at an exponential rate. Within a short time, Internet usage is expected to become as commonplace as voice telephone usage is today.

As such, a large number of options are available today for Internet access, e.g., wired LAN (Ethernet), wireless LAN, unlicensed band (ISM and UNII) data applications (Metricom, etc.), cable, XDSL, Bluetooth, high speed fixed wireless network (MMDS and LMDS), cellular/PCS and third generation data networks (HDR, CDMA, EDGE, etc.). Each Internet access network has strengths and weaknesses, and is designed for optimal use under a given set of conditions, e.g., a cellular/PCS network is more appropriate for a high-speed mobile user whereas a wired LAN is more appropriate for a stationary user with access to a physical wire connection.

The ability to roam or switch between Internet access systems is required for a truly mobile data communications system. Furthermore, the ability to switch from system to system based on capacity, cost and security consideration is highly desirable. As software applications advance, transfers between systems in a user transparent manner (also known as "seamless HO") and roaming among different data networks based on the multiple-interface/multiple-connection concept becomes possible. The handoff speed improvement is also a desired result emanating from multiple-interface capabilities and multiple-connection capabilities of the mobile device.

Many applications of computer and mobile communications devices have found usage in both home, office, and mobile situations. As such, users want to have continuous or "always on" capabilities for such applications. However, as a user moves from their home computer to some form of transportation, and from the transportation to their office, the computing and/or voice device cannot support the application in an always on state, nor can the wireless and/or internet protocols. Further, wired and wireless communications links are not always available to support such computing platforms.

As such, there is a need in the art for an always on computing platform. There is also a need in the art for a communications system that can support an always on computing platform. There is also a need in the art for a communications system that can support an always on computing system using various protocols and communications links.

SUMMARY OF THE INVENTION

To overcome the limitations in the prior art described above, and to overcome other limitations that will become apparent upon reading and understanding the present specification, the present invention discloses a system and a method for communicating with a mobile personal computing device. The system comprises a home agent (HA), a first network, and at least a second network. The first and second networks are coupled to the HA via an interconnecting network. The first network provides a signaling path and a data path to a mobile personal computing device and the second network provides a signaling path to the mobile personal computing device, the HA switching the data path from the first network to the second network when a predetermined condition occurs.

An object of the present invention is to provide an always on computing platform. Another object of the present invention is to provide a communications system that can support an always on computing platform. Another object of the present invention is to provide a communications system that can support an always on computing system using various protocols and communications links.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
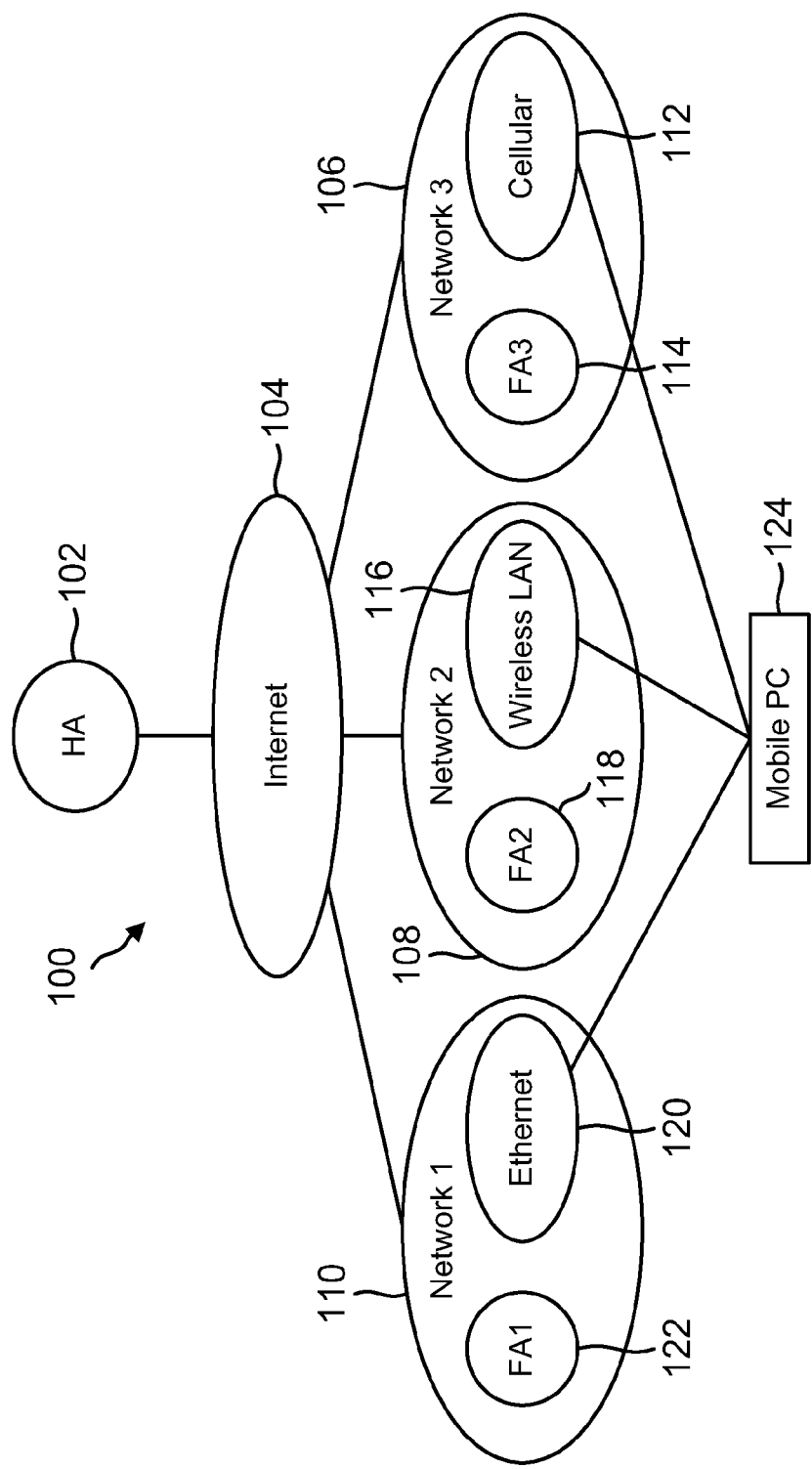
FIG. 1 illustrates a network topology using a multiple-interface/multiple-connection scheme as in the present invention.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention provides a mobile user the "always on" experience through the wire and wireless telephone network. The mobile unit can have a single Internet Protocol (IP) address and can be served by all available different IP networks (corporate Ethernet Local Area Network (LAN), Wireless LAN, ISM/NII band application, (Metricom, etc.), cable, XDSL, Bluetooth, LMDS/MMDS band, cellular, PCS and 3G) in a seamless manner.

The IP connection will be established with available wired and wireless networks through the intelligent Address Resolution Protocol (ARP) algorithm. Based on the user profile and available networks, the user can experience seamless Hand Offs (HO) from system to system with different networks. The mobile unit is enhanced as a pseudo router with multiple physical address to IP address mapping. Also, a centralized Home Agent will be used to provide seamless roaming and the same "look and feel" on the GUI and applications for subscribers. A subscriber can enjoy the simplicity of only one IP address, and the common user-friendly interface and seamless roaming/HO through the use of the present invention.

As an example, a user can start an Internet session using a corporate Ethernet system. During the middle of the Internet session, the user can unplug the Ethernet and the present invention will detect the disconnection status from the Ethernet and immediately start to transfer the data to a user-specified secondary connection. One option for the user to specify would be a wireless LAN, but other options are available for selection by the user. The switchover from the corporate Ethernet or wire based technology to a wireless technology does not interrupt or "tear down" the Internet session. The user may experience a slight delay for incoming traffic during connection switchover from the Ethernet to wireless LAN, but the outgoing traffic will be routed immediately to the wireless LAN through intelligent Address Resolution of the mobile unit. When the switchover is completed, the Internet session has been seamlessly transferred the wireless LAN network. The same procedure applies when the user leaves the wireless LAN coverage area, the present invention detects the lack of wireless LAN support and seamlessly switches the user to another wireless network, e.g., the cellular telephone network.

The present invention can continue the seamless transfer of the data connection from one communications service to another based on the user specified profile for which connection the user desires the Internet connection to employ. To continue the above example, once the user arrives home and plugs the mobile unit into the MMDS/LMDS wireless high speed data port, the Internet connection will be again seamlessly transferred from the cellular network to the MMDS network.

The present invention provides a common GUI, common setup and teardown features, a better Quality of Service (QoS), and a choice of service based on the user's preference e.g., price, latency, etc., and the situation e.g., bandwidth requirement of the application, time of day, available network resources, location, etc.

The present invention also provides benefits to communication service providers because the present invention allows the providers to provide transparent and cost-effective "one-stop shopping" for consumer Internet connectivity solutions. It also enables wireless operators to develop more personalized service to increase ARPU.

The present invention provides a solution to support high speed data transfer through a wireless communication system. The technologies used in a fixed wireless data arena support slow speed HO. With the present invention, a user can use the fixed wireless high speed data in a slow moving environment, and reserve the use of cellular communications services for situations when the standard telephone (wire) network or fixed wireless (LAN) networks cannot support the user's needs.

The present invention is an integrated solution that provides network operators as well as consumers more flexible services and features, as well as pricing and QoS options. The user can also direct the present invention to change from a lowest price selection criteria to a highest QoS selection criteria depending on the situation that the user requires. For example, if the user is checking email messages, the user might want to use a low price service, since email may not be that important. However, if the user is transferring time-critical information from one geographic location to another, the user may want to use a high QoS service to ensure that the information travels as fast as possible. Further, the switch from one service to another is transparent to the user during the online session.

Network Architecture

In a mobile IP environment, current proposals suggest the use of a first Foreign Agent (FA) as the anchor during the mobile handoff within a system. Such a solution becomes impractical for inter-system handoff because the two systems involved may not be willing to take data packets from the other, and the subscriber will have to pay twice the network cost since the packet goes through both networks. Another proposed solution is the "break-and-connect" system, e.g., the mobile unit will connect to a new network after it disengages from the old one. The main drawback for this method is the time required for the mobile unit to re-register with the new network and re-authenticate with the Home Agent (HA). This inherent delay may be acceptable to a casual data user, but is unacceptable to a real-time application.

With the establishment of the multiple-interface/multiple-connection concept of the present invention, seamless switching between systems becomes possible and desirable because the user can then utilize whichever network provides the best Internet connection for the task at hand. Because the present invention extends current Mobile IP in a new dimension, e.g., the seamless roaming between different kinds of systems, for example cellular to wireless LAN, it is dubbed "Mobile IP Squared."

Multiple-Interface/Multiple-Connection

Unlike the present mobile IP strategy where only one connection from the mobile unit to the Home Agent (HA) can be managed, the multiple-interface/multiple-connection concept of the present invention can maintain multiple connections from the mobile unit to the HA. The HA maintains a table comprising multiple Foreign Agent (FA) entries. The HA will then tunnel the packet to the appropriate FA based on the user profile, e.g., least cost, highest speed, etc.

FIG. 1 illustrates a network topology using a multiple-interface/multiple-connection scheme as in the present invention.

Network topology 100 comprises a HA 102 coupled to a network 104, e.g., the Internet. Network 104 is coupled to several different types of other networks 106, 108 and 110. Network 106 can be, for example a cellular network 106, with a cellular system 112 and FA 114. Network 108 can be a wireless Local Area Network (LAN) 108, with a Wireless LAN system 116 and FA 118. Network 110 can be an ethernet network 110, with an ethernet system 120 and FA 122. Each of the systems 112, 116, and 120 can couple to a mobile unit 124. Mobile unit 124 can be a mobile personal computer, or a mobile telephone, or other mobile personal computing device. There can be other or additional interfaces between the mobile unit 124 and the HA 102 without departing from the scope of the present invention.

The Binding of Multiple-Interface/Multiple Connection

Figure 2:
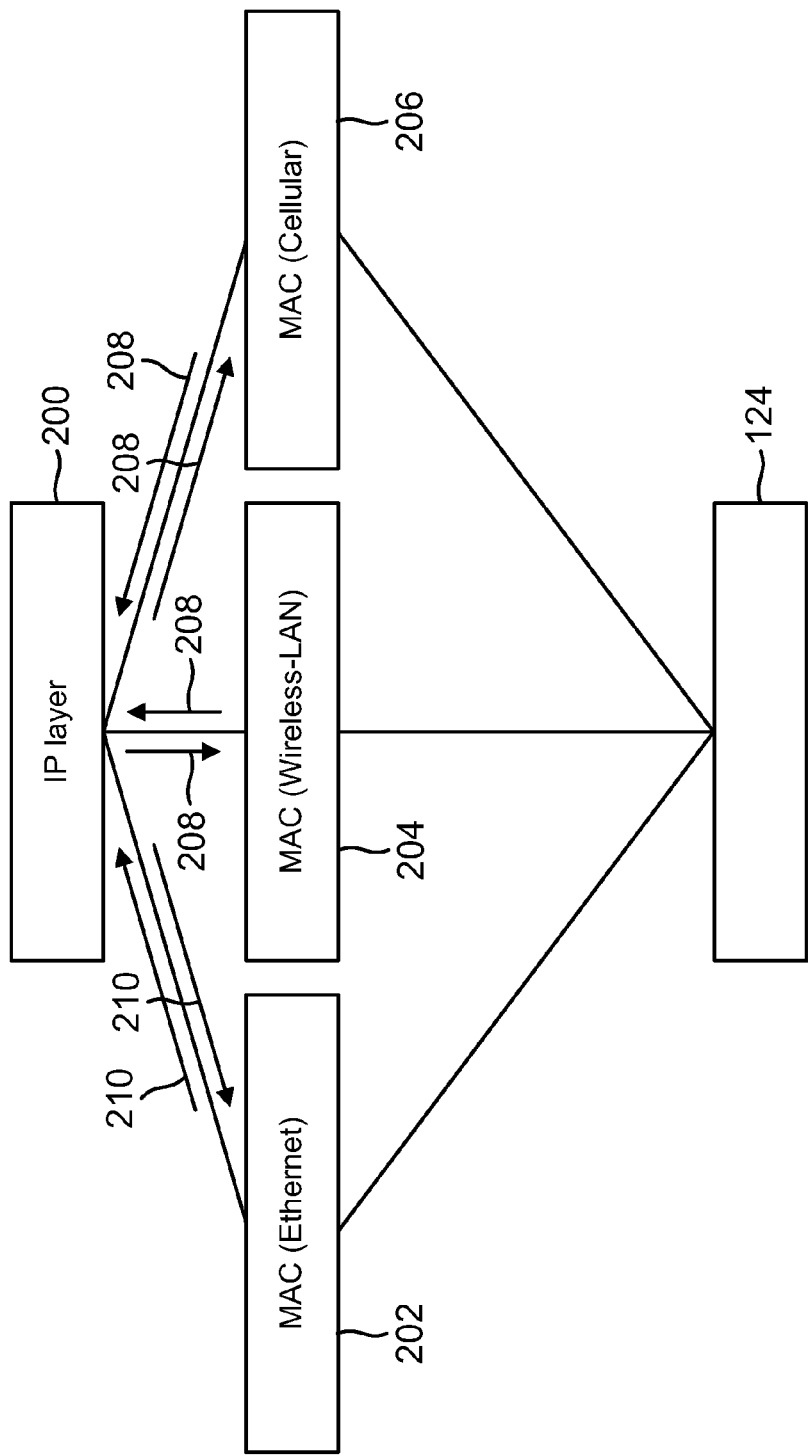
FIG. 2 illustrates the binding of the multiple interfaces of the present invention.

FIG. 2 illustrates the binding of the multiple interfaces of the present invention. Each system 112, 116, and 120 shown in FIG. 1 must interface with the Internet 104. Typically, this interface is controlled by the Media Access Control (MAC) layer, which is a protocol that controls access to the physical transmission medium of the network. The MAC layer is typically built into the network adapter.

As shown in FIG. 2, IP layer 200 can have multiple connections to multiple MACs 202, 204 and 206. MAC 202 is the MAC for the Ethernet network 110. MAC 204 is the MAC for the Wireless LAN network 108. MAC 206 is the MAC for the cellular network 106. Each connection is supported simultaneously. Between IP layer 200 and MACs 204 and 206, network management packers 208 manage the interface between IP layer 200 and MACs 204 and 206. Between IP layer 200 and MAC 202, a network management/traffic packet 210 is used to manage the network and traffic between IP layer 200 and MAC 202.

The mobile unit 124 performs a routing function from the IP layer 200 to the mobile unit 124 based on a user profile, e.g., the traffic packet is routed through an Ethernet interface if that is the preferred interface for that particular mobile unit 124. For a network management packet, the mobile unit 124 sends the packet back to the link it came from. Typically, there is one IP address corresponding to each MAC interface 202, 204 and 206. With a mobile unit 124, however, such a requirement is unnecessary. For Internet security reasons, it is desirable for a mobile packet to respond back to the MAC link where the packet came from. This security feature can be implemented by associating a connection with a class-of-service in the IP header.

User Profile Based Tunneling by HA

Figure 3:
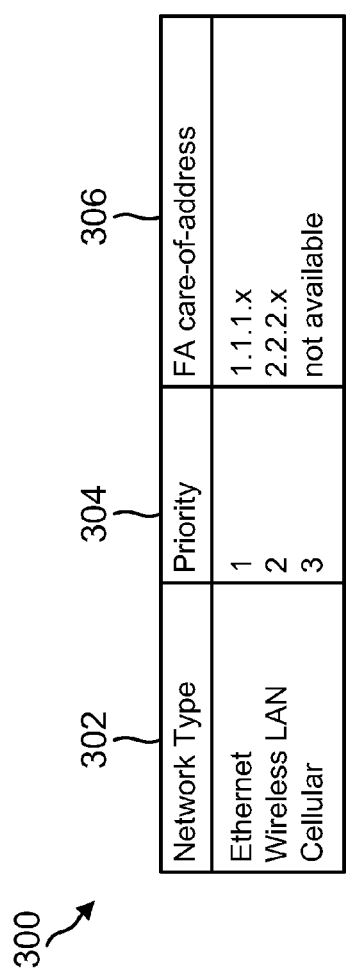
FIG. 3 illustrates a user profile as used in the present invention.

FIG. 3 illustrates a user profile as used in the present invention. Table 300 comprises a network type 302, a priority 304, and a FA care-of address 306 for each Internet connection for a given mobile unit 124. Each mobile unit 124 can have a different table 300, and each user can customize the table 300 to meet the needs of that mobile unit 124. For example, as shown in FIG. 3, mobile unit 124 has selected the Ethernet as network type 302 with the highest priority (1) 304. Other units 124 may select the cellular network 106 as their highest priority, etc. This table 300 directs the mobile unit 124 to check the highest priority 304 network type 302 before switching to a different network type 302. Further, each mobile unit 124 may have a different table 300 based on time of day, geographical location, logon name, or other qualities that will vary for a given mobile unit 124. Based on the user defined preference as shown in the priority 304 column, the Ethernet connection is selected as the tunneling destination for all packets whose destination is the roaming mobile unit 124. Note that the cellular system is not available in the example of FIG. 3, but can be available without departing from the scope of the present invention.

Dynamic Update of HA Connection Table

The HA connection table 300 can be dynamically updated by the mobile unit 124 to select the desired Internet 104 service link. After the mobile unit 124 powers up, the mobile unit 124 scans the available networks 106-110 based on the user profile table 300 stored in the mobile unit 124. The mobile unit 124 registers through all the networks 106, 108 and 110 that the mobile unit 124 can access and enables the corresponding MAC layer connection 202, 204 and 206 and control messages when the mobile unit sees a new FA 114, 118, or 122. The FA 114, 118, and 122 at each accessed network 106, 108 and 110 forwards its "care-of-address" back to the HA 102. The HA 102 updates its connection table with each entry corresponding to one network 106, 108 and 110. The HA 102 chooses one FA 114, 118, or 122 as the first option based on the preference 304 specified in the user profile table 300 and the application requirements. For example, a user might prefer wired Ethernet to wireless LAN and Cellular based access, because of traffic capacity and cost considerations.

Connections with all of the data networks 106, 108 and 110 are maintained dynamically. Similar to a cellular telephone Handoff concept, candidate system networks 106, 108 and 110 are checked regularly and connections are maintained based on user preference as stored in the table 300.

When the user moves from one system or network 106, 108 and 110 to the other, the mobile unit 124 updates the HA 102 and the system 100 automatically routes packets destined to the previous FA (e.g., the Ethernet LAN FA 122) to the wireless LAN FA 118 or the Cellular network FA 114, without breaking down the web browsing session, since control messages among these different systems have set up the connection already.

During the switching period, the packets arrived at the previous FA 114, 118, or 122 can either be discarded or forwarded to the new FA 114, 118, or 122. Such a switch can be triggered by two types of events. The first event is a forced switching event where the user accessing, for example, his/her corporate LAN for web browsing unplugs his/her Ethernet card from the network 110 during a downloading event. Since the wired LAN connection to network 110 no longer exists, the present invention informs the HA 102 immediately that the Ethernet 110 connection is down, and the HA 110 updates its connection table 300. All new packets will be sent to the wireless LAN network 108 FA 118 afterward, and thereby keeping the data flow to the unit 124 continuous.

The second event is a preference-driven switching event. For example, when a user enters a home or office building with wireless LAN network 108 coverage, the user might want to switch from a Cellular data network 106 to the wireless LAN network 108 for faster speed and lower cost. This switchover is accomplished by adding a new entry to the connection table 300 in the HA 102, and consequently all packets destined to the mobile will be tunneled to the wireless LAN network 108. Traffic from the mobile unit 124 can use the wireless LAN network 108 in because the same session security key is enforced. There is no need to authenticate with the correspondent party. When the cellular network 106 becomes unavailable, e.g., when the mobile unit 124 checks all its connections the next time, the present invention informs the HA 102 to take the cellular network 106 connection out of the connection table 300.

The IP session is transferred to the second network 106-110 option seamlessly. This is done by adding an enhancement to the Address Resolution Protocol (ARP) for controlling of the IP packet "physical" routing for multi-physical connections. Enhanced Common Management Information Protocol (CMIP) or enhanced echoed CMIP is used to more effectively control the IP tunneling between all potential systems.

Connection Update Implementation

Intelligent ARP provides the IP-address-to-MAC-address mapping. The intelligent ARP process of the present invention supports the mapping from single IP to multi-MAC addresses. Two very important advantages from ARP are that ARP hides physical MAC address from high level applications and allow them to work only with IP addresses, and ARP allows network engineers to access MAC address.

Internet Control Management Protocol (ICMP)

Figure 4:
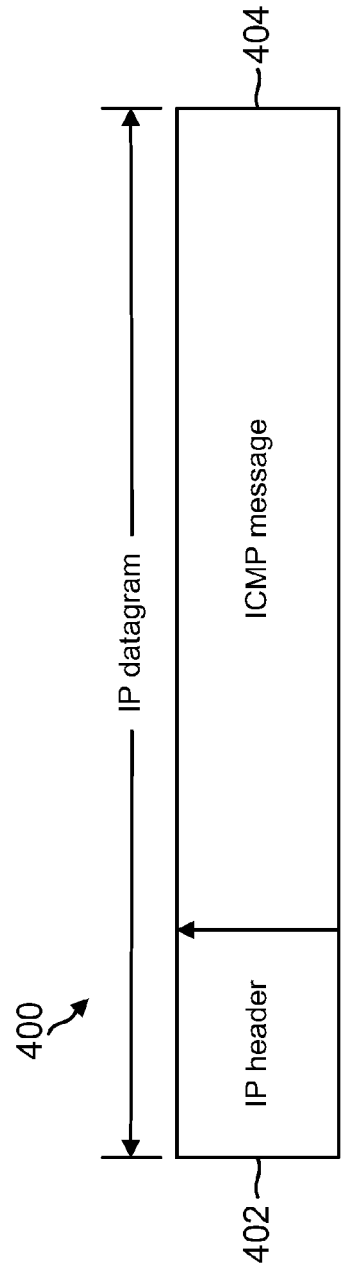
FIG. 4 illustrates an Internet Protocol (IP) datagram of the present invention.

FIG. 4 illustrates an Internet Protocol (IP) datagram of the present invention. The ICMP protocol is part of the Internet Protocol and uses the IP datagram delivery activity of FIG. 4 to send messages. IP datagram 400 comprises an IP header 402 and an Internet Control Message Protocol message 404. The IP header 402 typically provides addressing and other control functions for the IP datagram 400. The ICMP message is a TCP/IP protocol used to send error and control messages.

Figure 5:
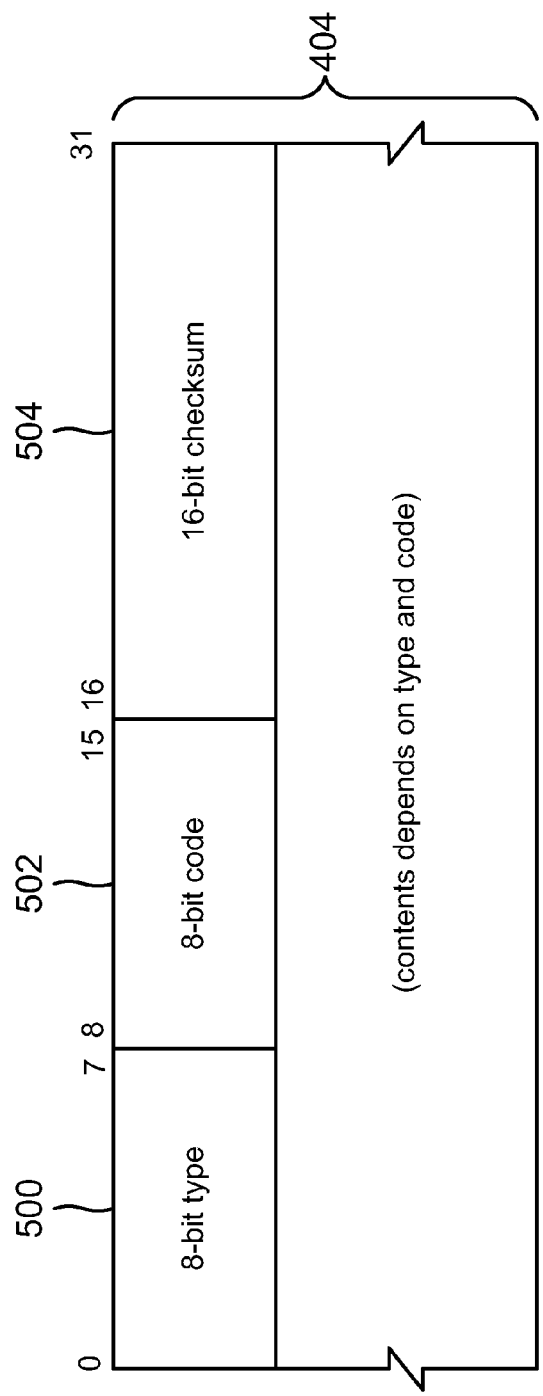
FIG. 5 illustrates a derailed description of an ICMP message described with respect to FIG. 4.

FIG. 5 illustrates a detailed description of an ICMP message described with respect to FIG. 4. ICMP message 404 comprises a type 500, a code 502, and a checksum 504. Typically the ICMP message 404 reforms control, error reporting and information functions for TCP/IP. The ICMP message 404 reforms flow control, detects unreachable destinations, redirects messaging routes, and checks remote hosts. Ping uses ICMP to send an Echo Reply ICMP packet with a statistical output from the other end of the system.

The present invention uses the ICMP message 404 as a vehicle for the mobile unit 124 to notify the next in line network 106-110 of the disconnection when the previous network 106-110 connection is either terminated or unavailable.

Scenario

Figure 6:
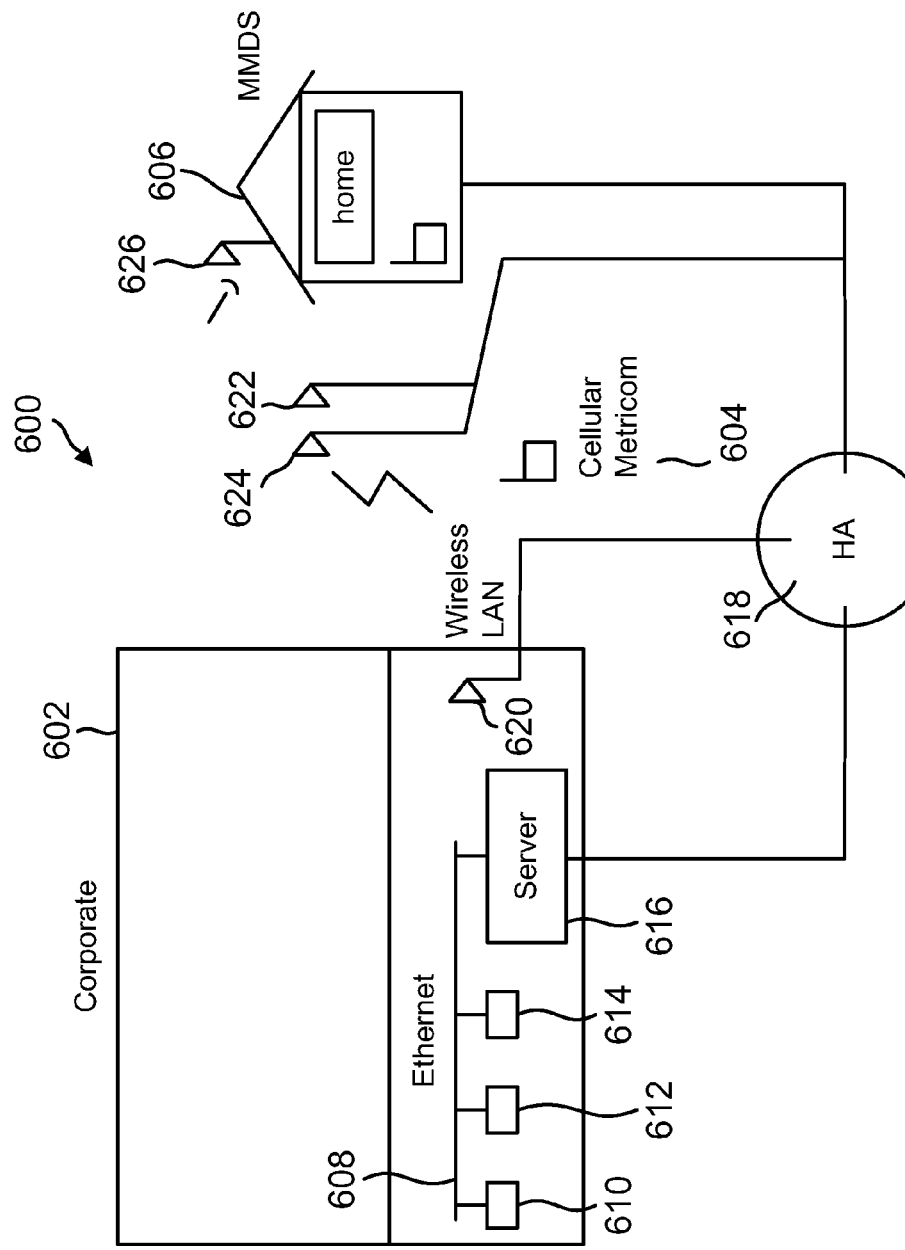
FIG. 6 illustrates how the inter systems roaming/handoff is implemented in the present invention.

FIG. 6 illustrates how the inter systems roaming/handoff is implemented in the present invention.

System 600 comprises a corporate or office building environment 602, a mobile environment 604, and a home office environment 606. In environment 602, an ethernet system 608 is used to supply data transfer and computing platforms for corporate users 610-614. Server 616 is used to provide interconnections to users 610-614. Initially, mobile unit 614 is powered up and connected to the corporate LAN 608 through an Ethernet connection. An Internet Protocol (IP) connection is established with the corporate LAN 608. The user profile is then downloaded from the Home Agent (HA) 618. Any potential system links are then established and maintained based on the user profile, e.g., Ethernet 608, wireless LAN 620, Metricom 622 and cellular 624.

The mobile unit 614 then sends/receives IP packets from the Ethernet 608. The mobile unit 614 transmits/receives IP packets from the Ethernet (corporate LAN) 608, and maintains both data and control links between the mobile unit 614 and the Ethernet 608. The control links on the wireless LAN 620, Metricom 622, and cellular 624 connections are also maintained at the same time by the present invention. ICMP messages are transmitted from all serving and standby FAs, and the mobile unit 614, to synchronize link status between the Ethernet 608, wireless LAN 620, Metricom 622, and cellular 624 systems.

The user then unplugs the mobile unit 614 from the Ethernet 608 and walks away from the Ethernet 608 toward the garage. The mobile unit 614 will then determine that the Ethernet 608 link is no longer available to mobile unit 614, and the second priority link will automatically be selected when the disconnection from the Ethernet 608 is detected. The Ethernet 608 connection is terminated properly, and the HA 618 will be notified to deliver IP packets to the new wireless LAN 620 FA. The IP packets routed to the Ethernet 608 FA can be re-tunneled to the wireless LAN 620 FA or simply discarded to let the upper layer do the re-transmission. The user typically experiences an unnoticeable delay in data transmission during switching, because the wireless LAN connection was initiated when the user initiated the session when the PC was coupled to the Ethernet 608.

The user will eventually want to continue sessions beyond the corporate 602 environment. For those occasions when the user is unplugged from the Ethernet 608, and out of range of the wireless LAN 620, e.g., when the mobile unit 614 is with the user while on a commuter train, driving home, etc., the present invention seamlessly transitions the user's mobile unit 614 automatically from the wireless LAN 620 to Metricom system 622 or cellular 624 depending on the user profile. The next priority link in table 300 will automatically be selected when the present invention automatically detects the terminated link, i.e., the termination of wireless LAN 620 connections. The wireless LAN 620 connection is terminated properly, and the HA 618 is notified to deliver IP packets through the new Metricom 622 or cellular 624 FA. Any IP packets stuck at the wireless LAN 620 can be routed directly to the Metricom 622 or cellular 624 FA through tunneling or can be sent again from the upper layer of the sender. Again, the mobile unit 614 typically only experiences a slight data delivery delay. The transition point for switching networks can also be based on absolute location since the mobile unit 614 location can be easily identified through mobile location technologies.

Eventually, the user will arrive at his/her home and plug mobile unit 614 into a Multichannel Multipoint Distribution Service (also Microwave Multipoint Distribution Service) (MMDS) System 626. The previous link, e.g., cellular 624 or Metricom 622 link, will stay connected until the MMDS 626 link is established and ready. The MMDS 626 link will be automatically detected, and the HA 618 will be notified to deliver IP packets through the new MMDS 626. Since the Metricom 622 or cellular 624 connection is still active, IP packets arrived at the Metricom 622 or cellular 624 FA can be delivered to the user's mobile unit 614 directly. The transition point for switching networks can also be based on absolute location since the mobile unit 614 location can be easily identified through current mobile location techniques. The speed of the connection can be adjusted in the background.

Figure 7:
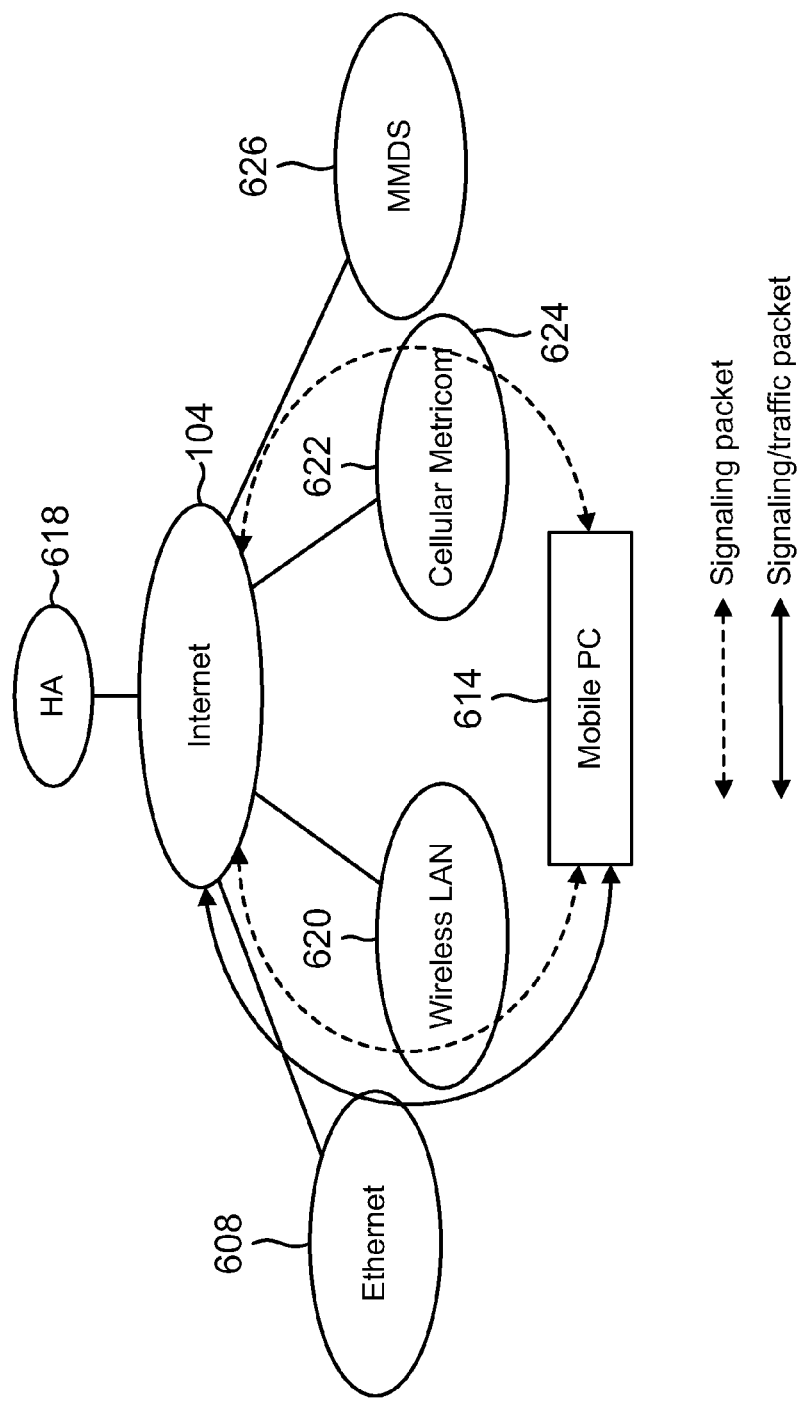
FIG. 7 illustrates the mobile PC using the Ethernet connection in parallel with other IP connections in accordance with the present invention.

FIG. 7 illustrates the mobile unit using the Ethernet connection in parallel with other IP connections in accordance with the present invention.

HA 618, upon mobile unit 614 power up, connects communications links through ethernet 608 as a signaling/traffic packet link, wireless LAN 620 as a signaling packet link, and through either the cellular 622 system or the Metricom system, or both, as a signalling packet link. The mobile unit 614 receives and transmits IP packets through the Ethernet 608 link as described above.

Figure 8:
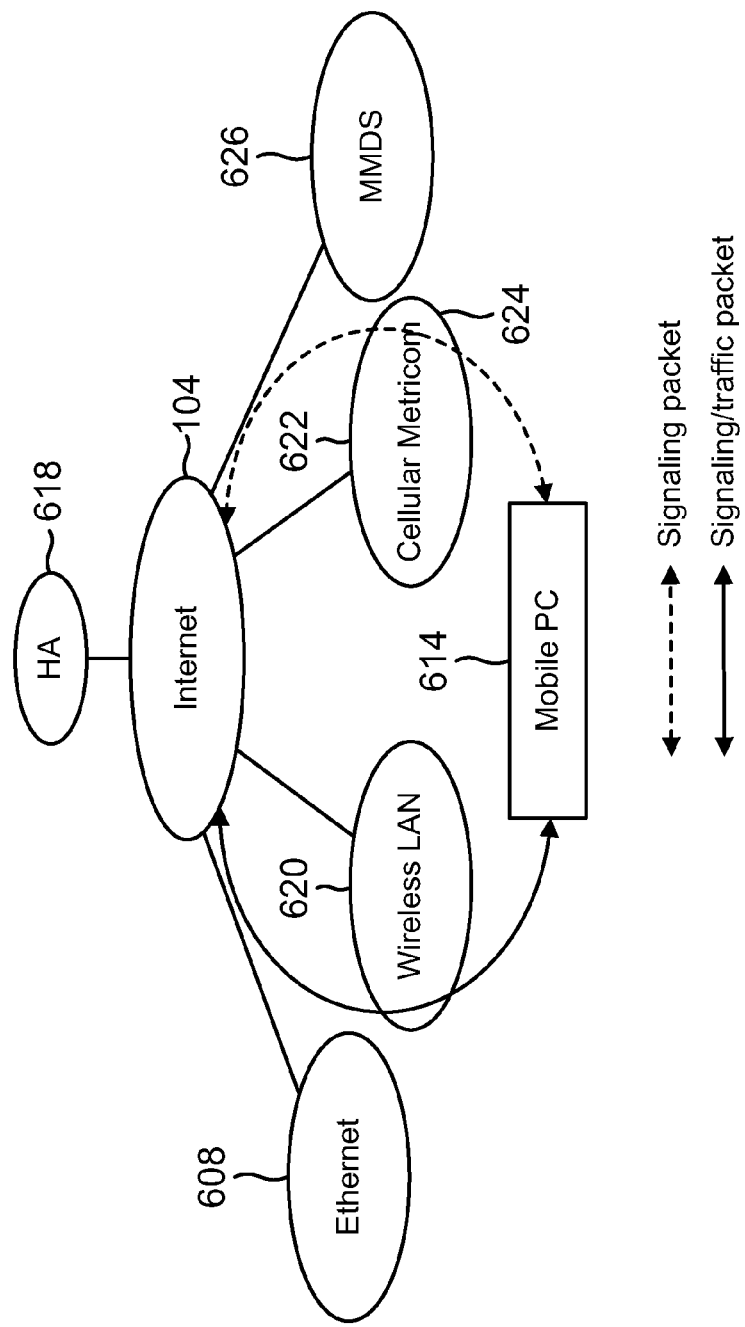
FIG. 8 illustrates the mobile PC using the wireless LAN connection in parallel with other IP connections in accordance with the present invention.

FIG. 8 illustrates the mobile unit using the wireless LAN connection in parallel with other IP connections in accordance with the present invention.

Once the mobile unit 614 is unplugged from the Ethernet 608, no traffic can be transmitted from the HA 618 to the mobile unit 614 through the Ethernet 608 link. As such, the present invention detects that the Ethernet 608 link no longer exists, and re-routes the signaling and traffic packet to the second or next priority service. In FIG. 8, this next priority service, after the Ethernet 608, is the wireless LAN 620 communications link. The signaling packet can still be sent through communications links on the cellular 624 and/or Metricom services.

Figure 9:
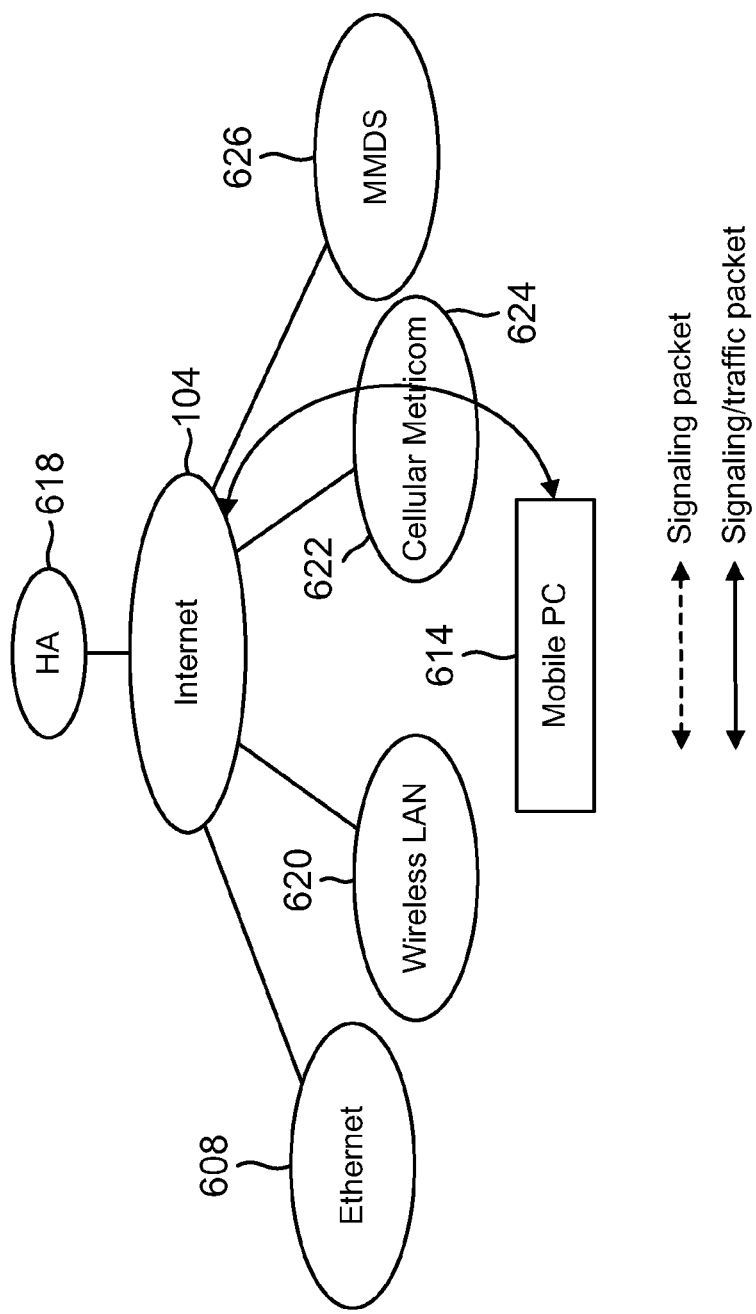
FIG. 9 illustrates the mobile PC using the cellular or Metricom connection in parallel with other IP connections in accordance with the present invention.

FIG. 9 illustrates the mobile unit using the cellular or Metricom connection in parallel with other IP connections in accordance with the present invention.

Again, once the mobile unit 614 is no longer connected to the Ethernet 608, and out of range of the wireless LAN 620, the present invention continues the communications link with the HA 618 through the cellular 624 link or the Metricom 622 link. The cellular 624 or Metricom 622 links can be in parallel or at different priorities within the priority table 300. The cellular 624 and/or the Metricom 622 link then becomes the signaling and traffic packet for the mobile unit 614.

Figure 10:
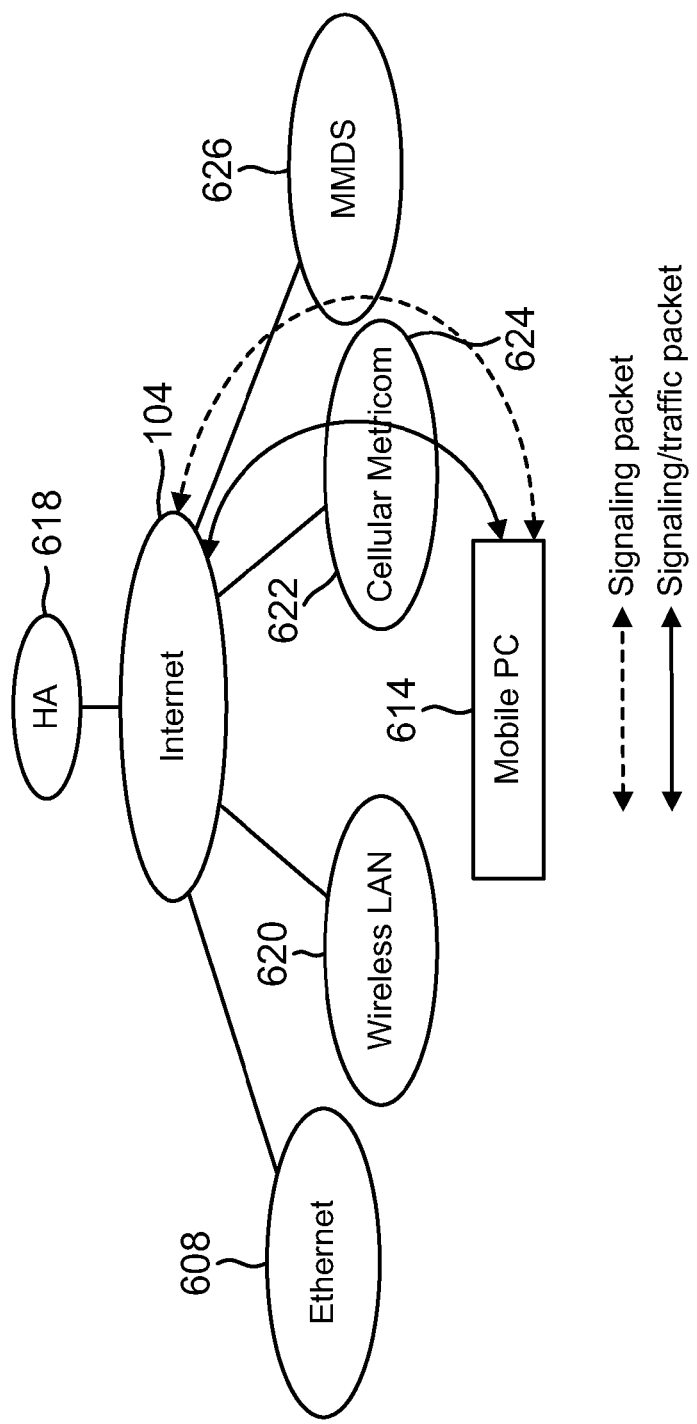
FIG. 10 illustrates the mobile PC initializing the MMDS connection in parallel with other IP connections in accordance with the present invention.

FIG. 10 illustrates the mobile unit initializing the MMDS connection in parallel with other IP connections in accordance with the present invention.

Once the mobile unit 614 is connected with the MMDS system 626, initialization of the MMDS session must take place. During initialization, signaling packets can travel over the MMDS 626, but the MMDS 626 is not ready to act as the traffic packet handler yet. As such, the cellular 624 or Metricom 622 system continues to act as the signaling and traffic packet communications link for mobile unit 614.

Figure 11:
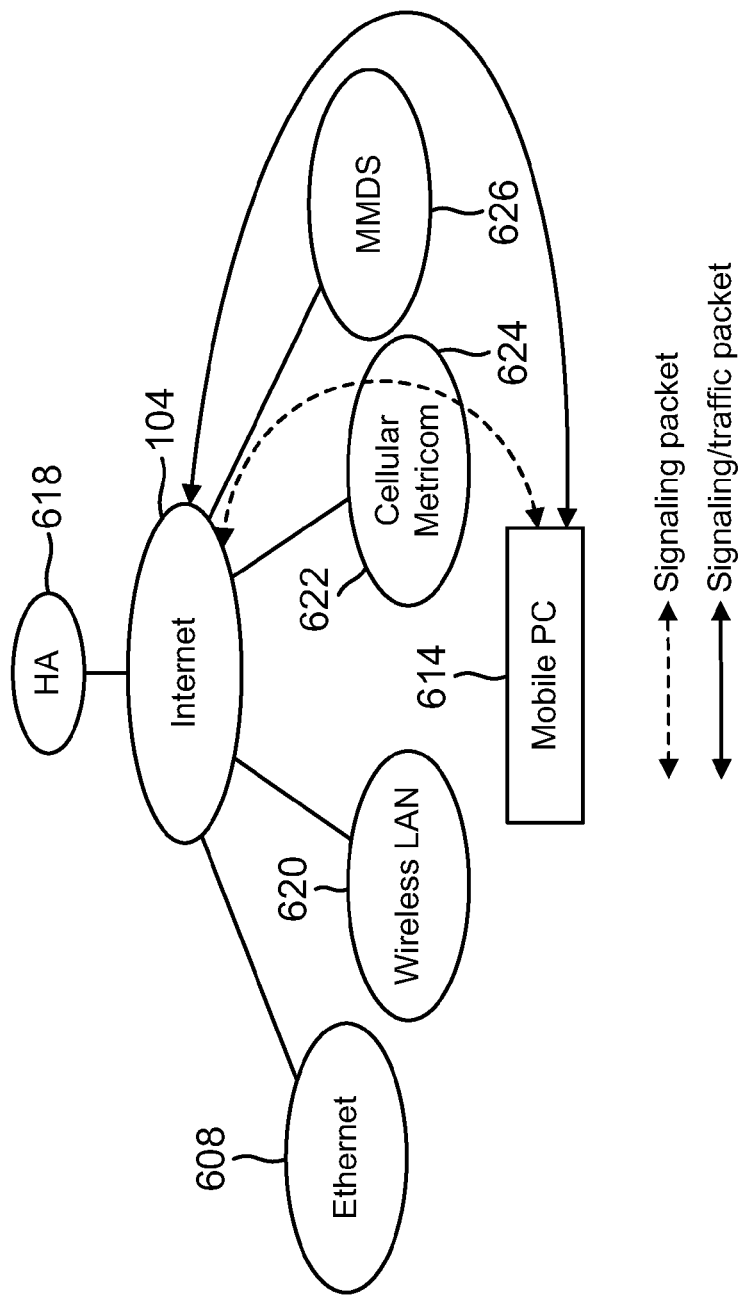
FIG. 11 illustrates the mobile PC using the MMDS connection in parallel with other IP connections in accordance with the present invention.

FIG. 11 illustrates the mobile PC using the MMDS connection in parallel with other IP connections in accordance with the present invention.

Once the MMDS 626 connections are established, the MMDS 626 communications link can act as the signaling and traffic packet link for mobile unit 614. The cellular 624 or Metricom 622 link reverts to a signaling packet communications link to enable the mobile unit 614 to be disconnected from the MMDS 626 and still provide continuous data delivery from the HA 618 to the mobile unit 614.

Process Chart

Figure 12:
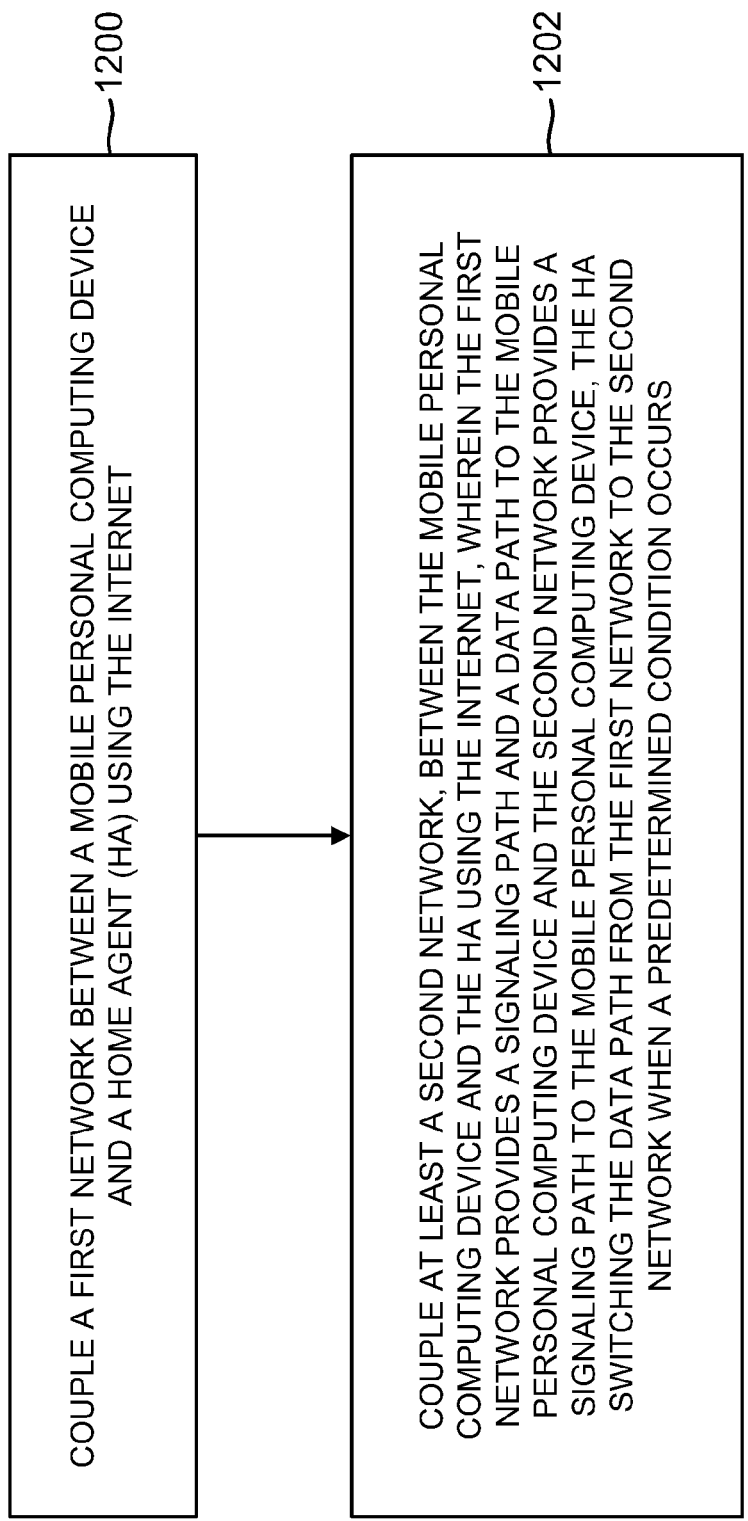
FIG. 12 is a flow chart illustrating the steps used to practice the present invention.

FIG. 12 is a flow chart illustrating the steps used to practice the present invention.

Block 1200 illustrates the step of coupling a first network between a mobile personal computing device and a Home Agent (HA) using the Internet.

Block 1202 illustrates the step of coupling at least a second network, between the mobile personal computing platform and the HA using the Internet, wherein the first network provides a signaling path and a data path from the HA to the mobile personal computing device and the second network provides a signaling path from the HA to the mobile personal computing device, the HA switching the data path from the first network to the second network when a predetermined condition occurs.

Benefits

The main benefits from multiple connections are that user can choose connections based upon user profile such as routing traffic based on available capacity, routing traffic based on throughput or pricing, and providing a method for inter-system and inter-technologies seamless roaming. The present invention also supports high speed HO in a mobile IP network, faster packet delivery, dynamic capacity control, user flexibility in selecting different systems based on pricing or QoS, and can be easily adapted for VPN applications and support the MPLS. Security can be ensured through firewall and encryption techniques.

The frequent switching between multiple connections becomes not only possible, but also highly desirable in many cases. The present invention eliminates the requirement that a user remain with a single network for each Internet session, and allows the user to travel between geographic locations during the same Internet session while maintaining a certain QoS and/or data throughput. In addition, when the primary connection (1$^{st}$ option) becomes unavailable, the mobile unit does not have to stumble through other networks for Internet connections because all the available connections have been established.

The present invention provides and maintains multi-connections provides consumers with real time seamless intelligent roaming and tunneling among HA and all FAs. The present invention also provides a more efficient and effective means (intelligent routing and location based) for data packers to be delivered to the final destination.

From a service provider perspective, a highly customized service for different segments of users can be created using the present invention. For example, a high-end user may choose performance over cost, and can arrange his user profile to reflect his desire for the best performance; the associated service provider can then, in that user's profile, specify the highest speed network for his/her use. For cost-conscious users who prefer a more cost-conscious method of communicating, the user profile can be altered to select the most cost effective method as the user travels.

From the user's perspective, the user can now rely on the present invention to select the proper Internet network connection according to his needs and desires, and maintain continuous service without his/her intervention. From a network perspective, control is provided for all different types of networks, enabling more efficient use of the available communications channels.

CONCLUSION

This concludes the description of the preferred embodiment of the invention. The following paragraphs describe some alternative methods of accomplishing the same objects. The present invention, although described with specific protocols, can use other protocols to accomplish the same goals. Although described with respect to serial communications between different communications services, parallel connections can be provided to increase speed and/or QoS of the data communications path between the HA and the mobile unit. The mobile unit can be any type of mobile personal computing or communicating device, such as a cellular telephone with Internet capabilities, a personal computer, or personal data assistant, without departing from the scope of the present invention.

In summary, the present invention discloses a system and a method for communicating with a mobile personal computing device. The system comprises a home agent (HA), a first network, and at least a second network. The first and second networks are coupled to the HA via an interconnecting network. The first network provides a signaling path and a data path to the mobile personal computing device and the second network provides a signaling path to the mobile personal computing device, the HA switching the data path from the first network to the second network when a predetermined condition occurs.

The method comprises coupling a first network between a mobile personal computing device and a Home Agent (HA) using the Internet, and coupling at least a second network between the mobile personal computing device and the HA using the Internet, wherein the first network provides a signaling path and a data path to the mobile personal computing device and the second network provides a signaling path to the mobile personal computing device, the HA switching the data path from the first network to the second network when a predetermined condition occurs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for communicating with a mobile personal computing device, comprising:

a home agent (HA);

a first network, coupled to the HA via an interconnecting network; and at least a second network, coupled to the HA via the interconnecting network;

wherein a mobile personal computing device has a single Internet Protocol (IP) address and is served by all available networks in parallel, in order to maintain multiple connections to the HA, and the HA dynamically maintains a connection table with an entry for each of the available networks, such that:

the first network provides a first signaling path and a data path for an Internet Protocol session to the mobile personal computing device, the second network provides a second signaling path to the mobile personal computing device, the mobile personal computing device simultaneously supports both the first and second signaling paths to the first and second networks, and the HA switches the data path for the Internet Protocol session from the first network to the second network when a predetermined condition occurs, but the switch does not interrupt or tear-down the Internet Protocol session for the mobile personal computing device.

2. The system of claim 1, wherein the predetermined condition is that the first network becomes unavailable to the mobile personal computing device.

3. The system of claim 1, wherein the predetermined condition is that use of the second network is less expensive than use of the first network.

4. The system of claim 1, wherein the predetermined condition is that use of the second network provides a higher Quality of Service (QoS) than use of the first network.

5. The system of claim 1, wherein the first network and the second network are selected from a group comprising an Ethernet network, a wireless Local Area Network (LAN), a cellular network, a Metricom network, and a Multichannel Multipoint Distribution Service (MMDS) network.

6. The system of claim 1, wherein the HA switches the data path from the first network to the second network after the second network is initialized.

7. The system of claim 6, wherein the HA switches the data path from the first network to the second network based on a user-specified profile.

8. The system of claim 1, wherein the mobile personal computing device determines which networks are available.

9. The system of claim 1, wherein the mobile personal computing device scans for available networks based on a user profile table stored in the mobile personal computing device.

10. The system of claim 9, wherein connections to the available networks are established and maintained based on the user profile table.

11. The system of claim 10, wherein the mobile personal computing device is served by the available networks, so long as the connections to the networks can be established and maintained.

12. A method for providing continuous access to an Internet, comprising:

coupling a first network between a mobile personal computing device and a Home Agent (HA) using the Internet;

coupling at least a second network, between the mobile personal computing device and the HA using the Internet; and wherein the mobile personal computing device has a single Internet Protocol (IP) address and is served by all available networks in parallel, in order to maintain multiple connections to the HA, and the HA dynamically maintains a connection table with an entry for each of the available networks, such that:

the first network provides a first signaling path and a data path for an Internet Protocol session to the mobile personal computing device, the second network provides a second signaling path to the mobile personal computing device, the mobile personal computing device simultaneously supports both the first and second signaling paths to the first and second networks, and the HA switches the data path for the Internet Protocol session from the first network to the second network when a predetermined condition occurs, but the switch does not interrupt or tear-down the Internet Protocol session for the mobile personal computing device.

13. The method of claim 12, wherein the predetermined condition is that the first network becomes unavailable to the mobile personal computing device.

14. The method of claim 12, wherein the predetermined condition is that use of the second network is less expensive than use of the first network.

15. The method of claim 12, wherein the predetermined condition is that use of the second network provides a higher Quality of Service (QoS) than use of the first network.

16. The method of claim 12, wherein the first network and the second network are selected from a group comprising an Ethernet network, a wireless Local Area Network (LAN), a cellular network, a Metricom network, and a Multichannel Multipoint Distribution Service (MMDS) network.

17. The method of claim 12, wherein the HA switches the data path from the first network to the second network after the second network is initialized.

18. The method of claim 17, wherein the HA switches the data path from the first network to the second network based on a user-specified profile.

19. The method of claim 17, wherein the mobile personal computing device determines which networks are available.

20. The method of claim 17, wherein the mobile personal computing device scans for available networks based on a user profile table stored in the mobile personal computing device.

21. The method of claim 20, wherein connections to the available networks are established and maintained based on the user profile table.

22. The method of claim 21, wherein the mobile personal computing device is served by the available networks, so long as the connections to the networks can be established and maintained.

\* \* \* \* \*